No. 754,542. PATENTED MAR. 15, 1904.
H. C. CHESSMAN.
ADJUSTABLE PLANT SUPPORT AND HOLDER.
APPLICATION FILED FEB. 28, 1903.
NO MODEL.
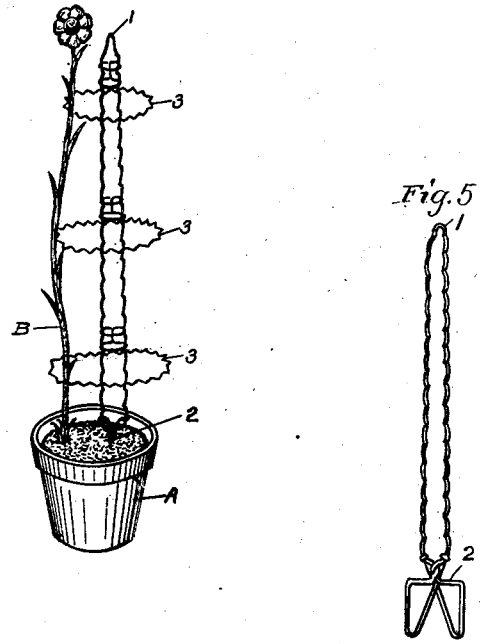
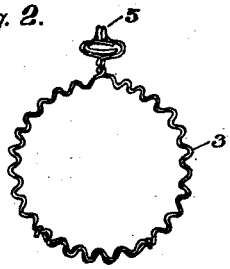
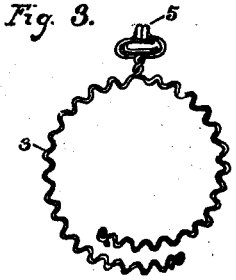
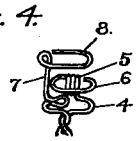
WITNESSES:
Edwin C. Dozier
Herbert R. Marlatt
H. C. CHESSMAN.
INVENTOR.
BY Robert W. Randle
ATTORNEY.

No. 754,542. Patented March 15, 1904.

UNITED STATES PATENT OFFICE.

HENRY C. CHESSMAN, OF RICHMOND, INDIANA, ASSIGNOR OF ONE-TENTH TO FRED S. ANDERSON, OF RICHMOND, INDIANA.

ADJUSTABLE PLANT SUPPORT AND HOLDER.

SPECIFICATION forming part of Letters Patent No. 754,542, dated March 15, 1904.

Application filed February 28, 1903. Serial No. 145,522. (No model.)

*To all whom it may concern:*

Be it known that I, HENRY C. CHESSMAN, a citizen of the United States, residing in the city of Richmond, in the county of Wayne and State of Indiana, have invented new and useful Improvements in Adjustable Plant Supports and Holders, of which the following is a specification, which, taken in connection with the accompanying drawings, forming a part thereof, is sufficiently clear and concise as to enable others skilled in the art to which it appertains to make and use the same.

My present invention relates to a device of the nature suggested in the above title to be formed of wire or the like, formed and arranged into the forms and arrangements substantially as shown in the drawings and for the purposes otherwhere herein specifically set forth.

The object of my invention, broadly speaking, is the provision of an adjustable plant-support and flower-pot holder, formed of wire or the like, which will support, govern, and control growing plants, especially those with long and slender stems—as, for instance, "carnations" (*Dianthus caryophyllus*) or the like—and, finally, an important object is the production of an article of manufacture, an adjustable plant-support and flower-pot holder, which can be manufactured and sold at a comparatively low price.

Other objects and advantages of my invention will appear from the following specification and from the accompanying drawings, forming a part thereof.

For a more thorough and comprehensive understanding of my invention I will now proceed to describe the invention in detail, which I will state as briefly and compactly as I may.

Referring now to the drawings, Figure 1 represents in perspective one manner of using my invention as applied in a flower-pot for the support of a plant. Fig. 2 is a vertical detail plan of one of the clamps with its ends connected. Fig. 3 is a vertical detail plan of one of the clamps with arms or ends detached from engagement with each other. Fig. 4 is a detail of the arrangement by which the clamps are secured to the upright standards, and Fig. 5 is an elevation of my preferred form of upright standard.

Similar indices refer to and denote like parts throughout the several views.

In detail the index A represents a flower-pot, and B a long-stemmed plant growing up from the soil therein.

1 represents my upright standard, consisting of an integral length of corrugated or crimped wire doubled at the top, forming two practically parallel portions a short distance apart, as shown. An anchor 2 is formed at the lower end of the standard 1 and is integral therewith, by which the standard 1 may be supported in the earth. Said anchor is formed by first twisting the lower portions of the standard together, then bending the parts outward a slight disance apart, then bending them downward some distance parallel with each other and with the standard, then bending the parts upward and inward at acute angles, crossing each other near the horizontal portion, and then securing the respective ends around the lower portions of the standard slightly above the said twisted portions. The anchor thus formed when properly placed in the earth provides a sufficient bearing to support the standard and its load in a vertical position.

For the support of a long-stemmed plant I provide a plurality of the clamps 3 of a smaller size wire than the standards, and the wire of which they are composed also being crimped or corrugated, as shown. Each of the clamps consist of an integral wire or of two wires, with two free ends forming arms, with their adjoining shoulder portions twisted together and extending back and forming a securing device, as follows: first, extending out and back, forming a loop 4 of a size to surround the two upright portions of the standard 1; second, one of the ends is turned to form a spiral spring 5, and that portion after leaving the spring is bent in and back toward the spring, forming the divider or spreader 6, adapted to extend between the two upright portions of the standard 1 to keep said parts properly spaced; third, the other end portion is then bent to extend upward, forming the arm 7, and is then bent to form the upper loop 8 of same size as the loop 4. It will now be seen that the clamps 3 can be spaced the proper distance apart at any point along the length of the standard 1, the members of the standards passing through the said loops 4 and 8, and said loops and the spacer 6, engaging in the corrugations of the standards, assisted by the spring 5, will hold the clamp in the position in which it is left, at the same time being of ready adjustment along the length of the standard, and the clamps will thus be held against accidental displacement and extending out at right angles from the standard 1, as shown in Fig. 1. It will also be apparent that the two arms of each clamp 3 may be adjusted as large or small as desired by simply lapping their end portions and engaging the hooks 9 with each other or with the corrugations of the other, as shown in Fig. 2. It is also apparent that the ends of the arms may be disengaged from each other and the arms opened out some distance apart in order to allow a stem of a plant to be taken in or out of the space inclosed by the arms. I have found it desirable in the training of certain plants—such, for instance, as carnations—to have three of the clamps mounted on the standard at substantially equal distance apart and then to train the plant through the lower clamp, outside the center clamp, and then inside the upper clamp, substantially as shown in Fig. 1, by which the plant is held in its proper position, and it will not be free to strike from side to side of the clamp or to become accidentally injured. Also a number of stalks can be so trained at one time in one set of supports. It will also be apparent that one of the clamps 3 may be adjusted in circumference to surround a flower-pot A immediately below the chime of the pot, as in Fig. 5, and that a hook C, with three or more depending arms, as D, E, and F, with hooks on their lower ends, may be employed, and that the hooks on the lower ends of said arms may be engaged in the corrugations of said clamp at three equal distances apart, and that the flower-pot A may then be suspended by the hook C, as shown in Fig. 5, to form a hanging basket or pot.

In some instances I prefer not to have the standards 1 corrugated, but to use smooth wire, as shown in Fig. 7, which under certain conditions I have found to give good results.

An important feature of my invention, which will be apparent, is that when not in use the clamps may be detached from the standards and that the clamps and the standards may be packed or stored in a small compass or space for future use or for transportation.

From the above description, when taken in connection with the accompanying drawings, it will be seen that I have produced an improved adjustable plant-support and flower-pot holder embodying the objects otherwhere referred to in this specification.

While I have illustrated and described the best means to me known at this time for carrying out the objects of my invention, I wish it to be understood that I do not restrict myself to the exact details of construction shown, but hold that any slight changes or variations in such details as would suggest themselves to the ordinary mechanic would clearly fall within the limit and scope of my invention.

My invention is perfectly adapted to accomplish the results for which it is intended, and it is evident that changes in and modifications of the specific construction herein shown and described may be made and that analogous parts may be used to accomplish the same results without departing from the spirit of my invention or sacrificing any of its many advantages.

I wish it to be distinctly understood that I do not dedicate any part of my invention to the public and that I wish adequate and just protection for every feature of my invention and the various parts herein shown and described that are new and useful and which involve invention.

Having now fully shown and described my invention and the best means for its construction and use to me known at this time, what I claim as new, and desire to secure by Letters Patent of the United States, is—

1. A device of the class described formed of crimped wire, comprising a standard, a number of plant-supporting clamps adapted to be adjusted circumferentially and to be attached to said standard, said clamps having two arms adapted to overlap each other at their outer portions and to be locked together, all substantially as shown and described.

2. A device of the class described formed of crimped wire, comprising a double standard with an anchor formed on its lower end integral thereof, a number of horizontal clamps each formed with two outwardly-extending arms adapted to be connected adjustably to said standard, means for locking together the outer ends of said arms to vary the space inclosed thereby, all substantially as shown and described.

3. A device of the class described formed of wire, comprising a standard with an anchor integral thereof formed on its lower end, a number of clamps having two outwardly-extending arms, means for adjustably connecting the outer ends of said arms, and means for adjustably connecting said arms to the standard, all substantially as shown and described.

In testimony whereof I have hereunto signed my name to this specification in the presence of two subscribing witnesses.

HENRY C. CHESSMAN.

Witnesses:
R. W. RANDLE,
R. E. RANDLE.